(12) United States Patent
Spielman

(10) Patent No.: US 9,895,698 B2
(45) Date of Patent: Feb. 20, 2018

(54) TOBACCO GRINDER AND/OR TOBACCO SORTING AND/OR LOADING DEVICE

(71) Applicant: Zachary Elliott Spielman, Keswick, VA (US)

(72) Inventor: Zachary Elliott Spielman, Keswick, VA (US)

( * ) Notice: Subject to any disclaimer, the term of this patent is extended or adjusted under 35 U.S.C. 154(b) by 592 days.

(21) Appl. No.: 14/255,787

(22) Filed: Apr. 17, 2014

(65) Prior Publication Data

US 2015/0298135 A1   Oct. 22, 2015

(51) Int. Cl.
| | |
|---|---|
| *B02C 18/14* | (2006.01) |
| *A24F 23/00* | (2006.01) |
| *A47J 42/24* | (2006.01) |
| *A47J 42/50* | (2006.01) |
| *B02C 13/24* | (2006.01) |
| *B02C 18/08* | (2006.01) |
| *B02C 18/22* | (2006.01) |

(52) U.S. Cl.
CPC ............ *B02C 18/144* (2013.01); *A24F 23/00* (2013.01); *A47J 42/24* (2013.01); *A47J 42/50* (2013.01); *B02C 13/24* (2013.01); *B02C 18/08* (2013.01); *B02C 18/2216* (2013.01)

(58) Field of Classification Search
CPC ... A24C 5/02; A24C 5/42; A24F 23/00; A24F 23/04; A47J 42/12; A47J 42/14; A47J 42/26; A24B 7/04; B02C 18/144
USPC .................................................... 241/101.01
See application file for complete search history.

(56) References Cited

U.S. PATENT DOCUMENTS

| | | | |
|---|---|---|---|
| 2,740,363 A | 4/1956 | Freedman | |
| 3,402,646 A | 9/1968 | Hall | |
| 2005/0227602 A1* | 10/2005 | Hartwick | A22C 7/00 452/30 |
| 2010/0301806 A1* | 12/2010 | Ormaza | A47J 42/26 320/115 |
| 2011/0121145 A1* | 5/2011 | Mihajlovic | F21S 6/001 248/188 |
| 2014/0261471 A1* | 9/2014 | Ruzycky | A24C 5/02 131/108 |

FOREIGN PATENT DOCUMENTS

| | | |
|---|---|---|
| WO | PCT/IB2000/000341 | 3/2000 |
| WO | PCT/US2012/061498 | 10/2012 |

OTHER PUBLICATIONS

Wikipedia—Paramagnetism.*
The American Heritage Dictionary—Paramagnetism.*
U.S. Appl. No. 13/280,795, filed Oct. 2011, Hainbach.
U.S. Appl. No. 12/472,372, filed May 2009, Ormaza, et al.
(Continued)

*Primary Examiner* — R. K. Arundale
*Assistant Examiner* — Joseph Finan, Jr.
(74) *Attorney, Agent, or Firm* — Matthew A. Pequignot; Pequignot + Myers LLC

(57) ABSTRACT

Grinding apparatus for grinding substances, such as tobacco. In certain embodiments, grinding apparatus with a plurality of receptacles which can be selectively filled with a ground product, such as tobacco. In still other embodiments, a grinding apparatus with a selector capability or mechanism for selecting one or more of a plurality of receptacles, or storage area(s), for delivery of a ground product.

12 Claims, 13 Drawing Sheets

(56) References Cited

OTHER PUBLICATIONS

U.S. Appl. No. 11/111,304, filed Apr. 2005, Simester.
U.S. Appl. No. 13/182,957, filed Jul. 2011, Sinclair.
U.S. Appl. No. 10/922,048, filed Aug. 2004, Bachmann.
Smokecones.com, webpage printout, Category: filling devices, http://smokecones.com/filling-devices-c-29.html, printed Nov. 18, 2014 (attached).
Rawthentic.com, webpage printout, http://rawthentic.com/classic/cones/?age-verified=c6e7e1d648, printed Nov. 30, 2014 (attached)
Google image search, "cigarette roller," results printed Nov. 30, 2014 (attached).
Google image search, "automatic joint roller," results printed Nov. 30, 2014 (attached).
YouTube video, "Super Joint Machine," by ConesSmoke, uploaded Feb. 1, 2011, https://www.youtube.com/watch?v=gtDBo96m69M, last accessed Nov. 30, 2014.

* cited by examiner

TOBACCO GRINDER AND/OR TOBACCO SORTING AND/OR LOADING DEVICE

FIELD OF THE INVENTION

This invention relates to a grinding apparatus for grinding substances, such as tobacco. In certain embodiments, this invention relates to a grinding apparatus with a plurality of receptacles which can be selectively filled with a ground product, such as tobacco.

BACKGROUND OF THE INVENTION

Although tobacco products have been produced and sold as pre-manufactured products (such as pre-made cigarettes, offered in cartons) by commercial enterprises for more than 100 years, there remains a demand in the art for hand made or custom made tobacco and related products.

For example, many smokers or consumers of smokeable products believe that "roll-your-own" tobacco or smoking products are not as harmful to human health as commercially sold smoking products. This is, in part, because a person hand rolling a smokeable product, such as a cigarette, can control the specific content of the product and therefore potentially eliminate, or at least limit, undesirable chemicals in the custom "rolling" process.

Moreover, because of the taxation of pre-manufactured cigarettes (on state and federal levels, as well as by countries other than the United States), there is oftentimes an incentive to custom or hand roll smokeable products to avoid taxation and thereby reduce the cost of tobacco or other smokeable products to the consumer.

In addition to the above reasons, there is also sometimes a social factor which lends to the desirability of hand or custom rolling smokeable products. For example, "hookah" smoking has become popular in recent years with restaurants sometimes including hookah bar or smoking areas. Entire lounges devoted to hookah smoking have also emerged on the social scene. Similar to this phenomenon, the custom or hand rolling of tobacco or other smokeable products can and often does serve or function as a desirable component of a social gathering, such as a private party at a household.

Still furthermore, it may be desirable to add or substitute smokeable substances, in custom rolled smoking products, to obtain custom, smokeable "cigarettes" which contain smokable matter not otherwise readily available in pre-manufactured cigarette products. For example, custom rolling of cigarette type products which contain flavored tobacco(s), cloves, mixtures of tobaccos, or even cannabis (where legal, or for legal, medical purposes) is possible.

Even though the hand or custom "cigarette" rolling arts have included numerous innovations over the years related to grinders and rolling papers and the like, there remain certain desires for improvements in hand rolling operations, processes, and/or products, which often involve grinders for the grinding of tobacco (or other smokeable products).

In view of the above-enumerated drawbacks and/or needs or desires for improvements in the smokeable products arts, it is a purpose of the herein described invention to address one or more of such drawbacks and/or desires as well as, or in the alternative, other needs which will become more apparent to the skilled artisan once given the present disclosure.

SUMMARY OF CERTAIN EMBODIMENTS OF THE INVENTION

Generally speaking, certain embodiments of this invention relate to grinding and/or ground matter storage devices. In certain embodiments of this invention, apparatus are provided which are useful for grinding or macerating smokeable or other grindable substances, and, in some cases, thereafter storing the ground or macerated material. In still further non-limiting embodiments, the apparatus provide receptacles for selectively receiving separate volumes of ground or macerated material.

In one non-limiting embodiment of the invention, there is provided apparatus comprising: a grinding chamber, including a grinder mechanism, for grinding a grindable material; an intermediate chamber for receiving ground material which has been ground by the grinder mechanism, the intermediate chamber including an aperture for delivery of ground material from the intermediate chamber to a selected delivery location; a plurality of receptacles for receiving ground material, ground by the grinder and contained within the intermediate chamber, each one of the plurality of receptacles defining a separate receptacle volume, each of the separate receptacle volumes each being separately, selectively alignable with the aperture of the intermediate chamber to thereby selectively receive ground material dispensed from the intermediate chamber.

In certain non-limiting, but preferred, embodiments, such as described and illustrated herein, a plurality of receptacles within the grinding apparatus are located spaced apart from one another, within a receptacle body, the receptacle body being rotatable about a central axis; the intermediate chamber being located within an intermediate body, the intermediate body also being rotatable about the central axis; wherein the intermediate body and the receptacle body are rotatable, about the central axis, with respect to one another thereby to selectively align one of the receptacle volumes with the aperture of the intermediate chamber to enable delivery of ground material from the intermediate chamber to the aligned receptacle volume via the aperture.

In still other non-limiting example embodiments, certain grinding or macerating apparatus are provided wherein the intermediate body has a top side and a bottom side; the grinding chamber being so located at and connected to the top side of the intermediate body such that when the grinder mechanism is operated to grind grindable material, ground material delivers from the grinding chamber to the intermediate chamber; the receptacle body being so located at and connected to the bottom side of the intermediate chamber, such that when the intermediate chamber contains ground material and the aperture of the intermediate chamber is aligned with a receptacle volume, ground material is delivered from the intermediate chamber to the aligned receptacle volume.

In order to aid in aligning the aperture of the intermediate chamber to one or more of the plurality of receptacle volumes, certain non-limiting example embodiments of the disclosed apparatus include one or more magnetic elements and one or more paramagnetic elements. The magnetic and paramagnetic elements are preferably so located and oriented such that attraction of the paramagnetic elements to the magnetic elements aids in aligning the aperture of the intermediate chamber to one or more of the plurality of receptacle volumes. In certain of these non-limiting embodiments, the apparatus further includes at least two spaced apart magnetic elements and at least two spaced apart paramagnetic elements, the magnetic and paramagnetic elements being located on opposite rotatable bodies selected from the intermediate body and the receptacle body, wherein when the at least two spaced apart magnetic elements are aligned with the at least two paramagnetic elements, as a result of rotation of the intermediate body relative to the receptacle body, the aperture of the intermediate body is aligned with a receptacle volume.

Certain example embodiments of the apparatus described herein include a storage mechanism or area or chamber in which material which has been ground or macerated may be stored. In one or of such non-limiting embodiments, a storage chamber is formed in a provided storage body, the storage body being located at and connected to the receptacle body. In such or other embodiments, at least one receptacle volume includes an opening at a bottom end thereof for ground material to pass through to be delivered to and stored within the storage chamber. In one or more of such or similar embodiments, at least one receptacle volume includes a bottom end which is at least substantially closed such that ground material may be retained, after grinding, in the receptacle volume.

In certain non-limiting embodiments of this invention, the provided apparatus include mechanisms or structural configurations which are provided for assisting in the loading or smokeable materials into custom or self-wrapping papers, so that smokeable cigarette-type products may ultimately be formed or otherwise obtained. In one or more of such example embodiments, at least one receptacle volume, in one or more of the herein described apparatus, includes a wrapping paper in a cone or cylindrical form, nested within the at least one receptacle volume, for receipt of ground material ground by the grinder mechanism and delivered by the aperture of the intermediate chamber. In certain embodiments, but not all embodiments, at least one of the described and illustrated receptacle volumes is preferably (but not necessarily) conical in configuration. In certain further example embodiments, an optional, removable tamping rod, preferably but not necessarily carried within a rod aperture, is provided to be used for tamping or packing ground or macerated material into or within loaded wrapping papers or cones, carried by one or more receptacle volumes.

In the grinding (or macerating) apparatus described herein, numerous ways of operating or conducting the grinding (or macerating) function are envisioned. For example, in certain embodiments, the grinder mechanism is a manually operated grinder mechanism which grinds material located within the grinding chamber, when the grinder mechanism is operated by hand. In other non-limiting embodiments, the grinder mechanism is optionally operated by a grinder motor, wherein the grinder mechanism grinds material located within the grinding chamber, when the grinder motor is operated.

In some non-limiting embodiments of the grinding apparatus described herein, the grinding apparatus is modular. For example, in certain examples of such embodiments, a provided grinding chamber is removably connected to the intermediate body; the intermediate body is removably connected to the receptacle body; and the receptacle body is removably connected to the storage body.

In certain embodiments, one or more mechanisms may be provided to assist or facilitate transmission of ground material from the intermediate chamber, or another area of the herein disclosed grinding apparatus, to at least one receptacle volume or to a storage area. In one example of such a non-limiting embodiment, a vibration inducing mechanism is provided which, when operated, induces vibration in at least the receptacle body and/or the intermediate body.

Certain examples of the invention are now described below with respect to certain non-limiting embodiments thereof as illustrated in the following drawings wherein:

DETAILED DESCRIPTION OF CERTAIN EMBODIMENTS

For a more complete understanding of the present invention, reference is now made to the following description of various illustrative and non-limiting embodiments thereof, taken in conjunction with the accompanying drawings in which like reference numbers indicate like features.

Addressing one or more of the above-described drawbacks or needs in the prior art (or other drawbacks or needs not specifically described herein), at least one embodiment of the subject invention comprises a grinding apparatus capable of grinding material, such as tobacco or other smokeable material, and selectively delivering desirable amounts of such ground material to chosen or selected receptacle volumes. In some embodiments, the ground material may also be delivered to a storage area or chamber, when desired, for later access or use by the device operator.

Referring now to FIGS. 1-10, a non-limiting, example embodiment of such a grinder apparatus 1 is illustrated therein. Grinder apparatus 1, as illustrated, generally comprises at least three main components (preferably detachable from one another), including a grinding mechanism 3 sitting on top of an intermediate body 4, which in turn is connected to a top portion of receptacle body 9. Optionally, a storage chamber body is also provided, attached at or to a bottom portion of receptacle body 9, in embodiments which include storage (e.g., as opposed to receptacle loading) functionalities. While FIG. 1, for example, illustrates a grinder apparatus having various parts, such as the external wall of receptacle body 9, as translucent or transparent, other embodiments utilize (partially or fully) opaque walls or parts (see, e.g., FIG. 2). The inclusion of translucent or transparent parts is largely for ornamental purposes, but may at times offer certain benefits to device functionality. For example, in embodiments which employ translucent or transparent parts, it is possible to see when chambers or receptacle volumes contain ground material (or when they contain smoking or rolling papers or cones).

Figure 1:
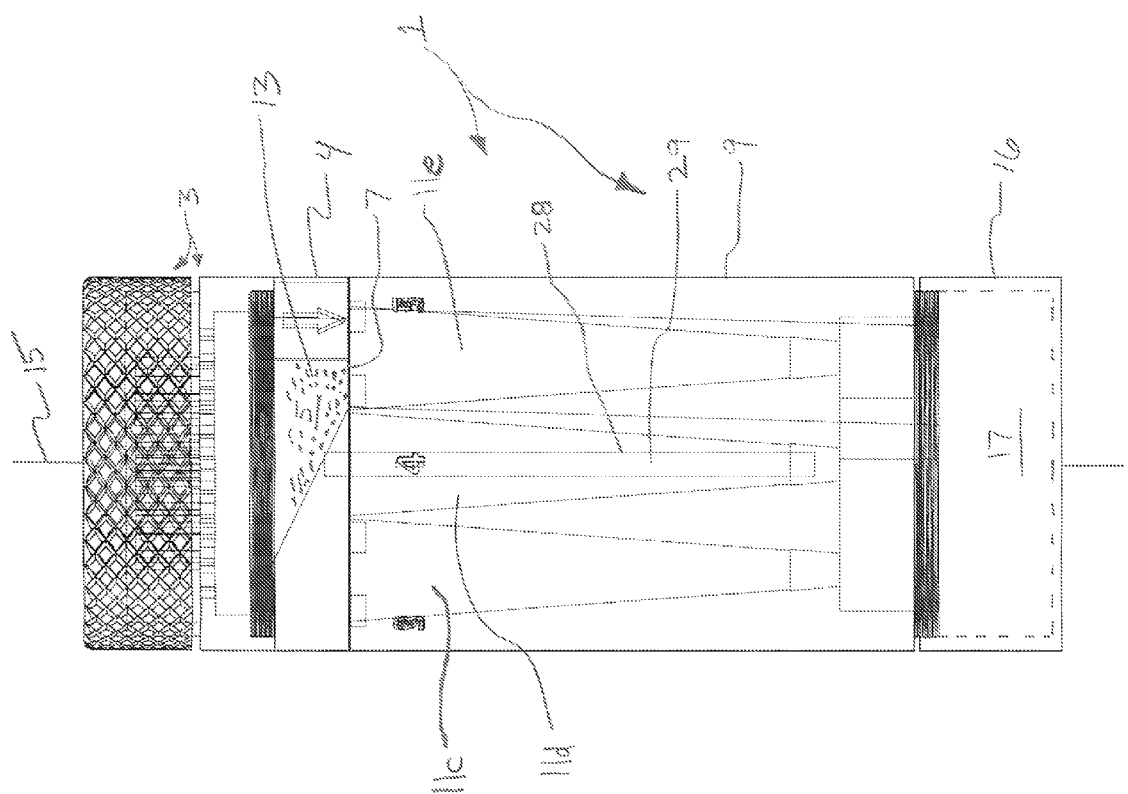
FIG. 1 illustrates one embodiment of a grinding apparatus according to the subject invention.
Figure 2:
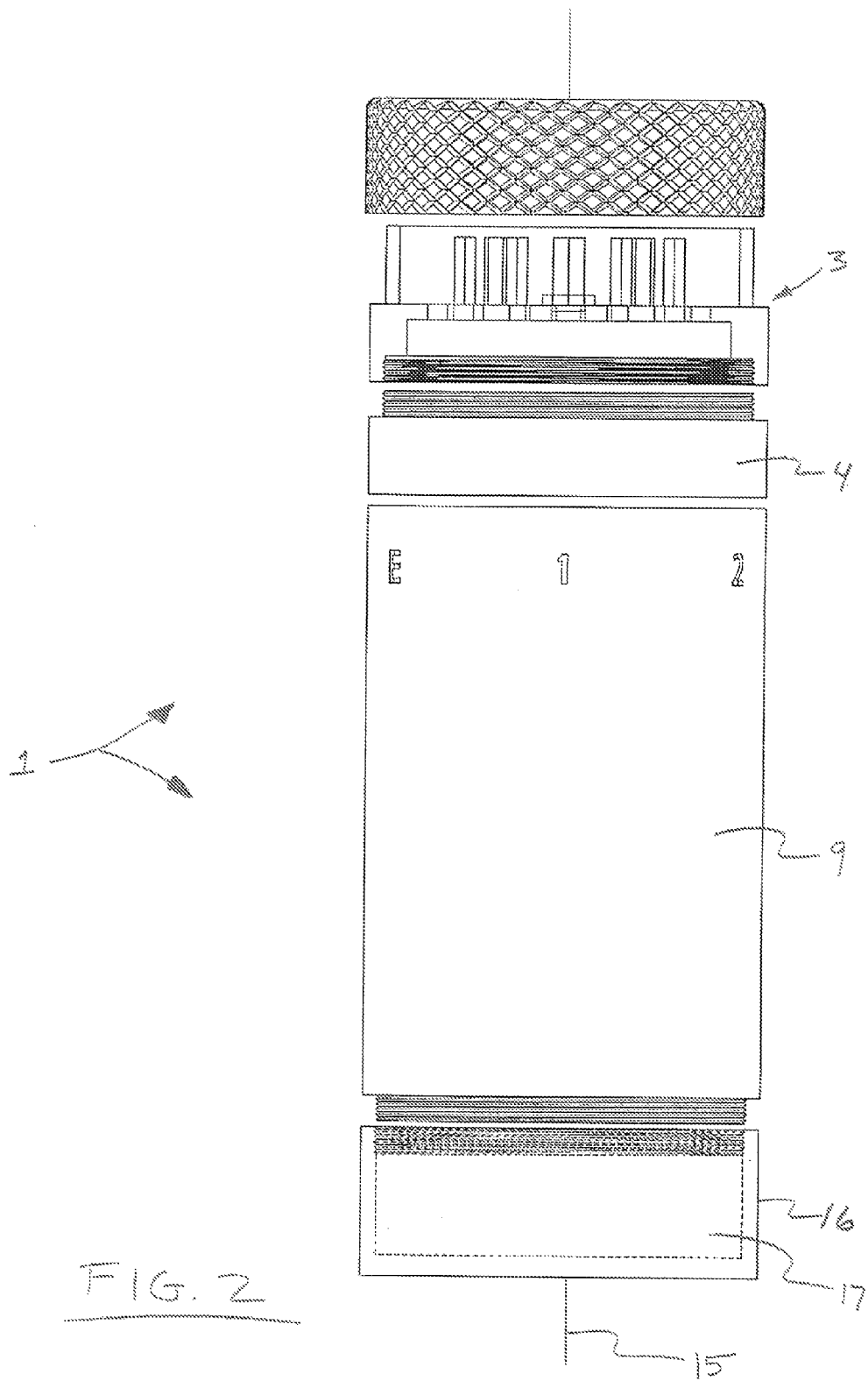
FIG. 2 illustrates an alternative embodiment of the apparatus depicted in FIG. 1, with an opaque rather than a transparent receptacle body.
Figure 3:
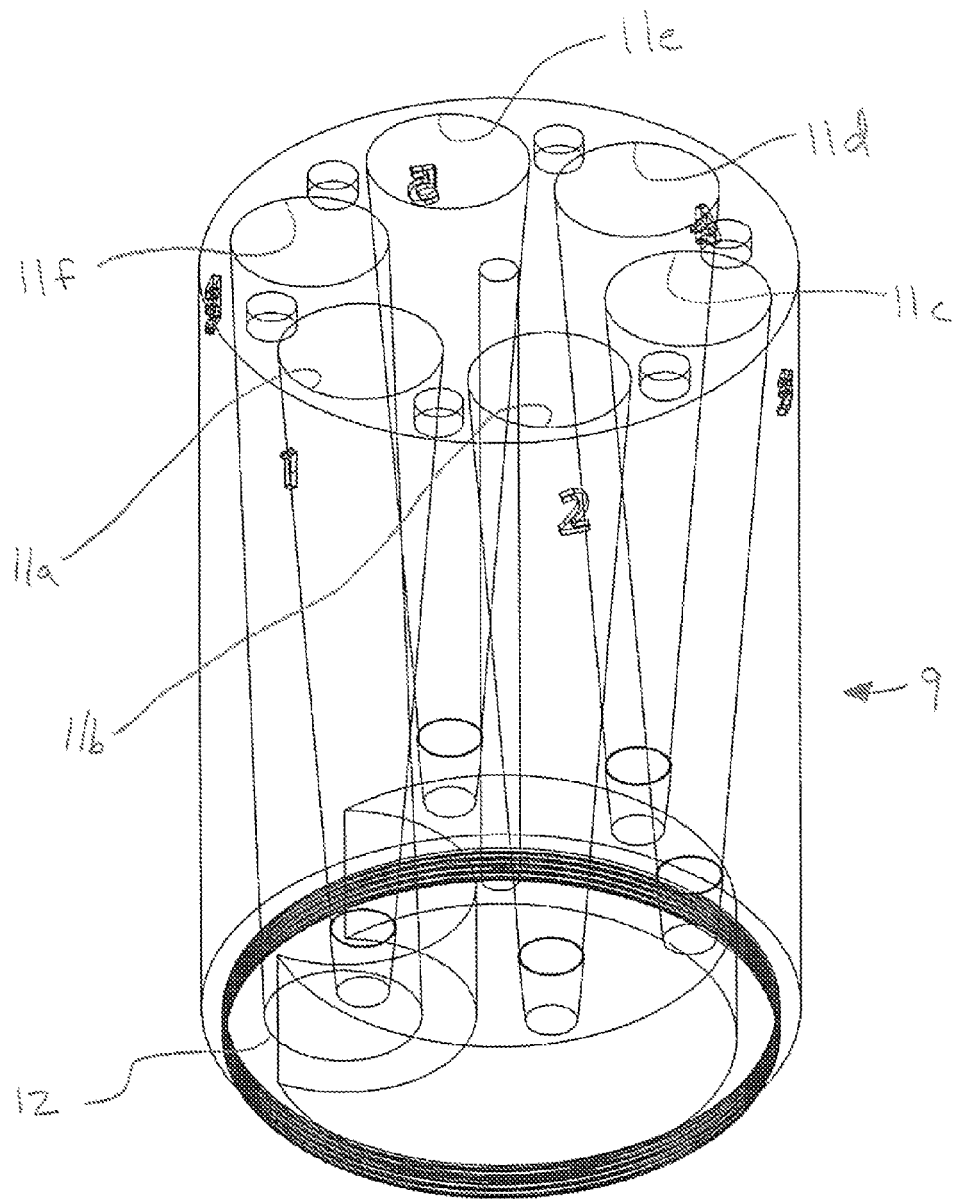
FIG. 3 illustrates one example of a receptacle body useful with the subject invention.
Figure 4:
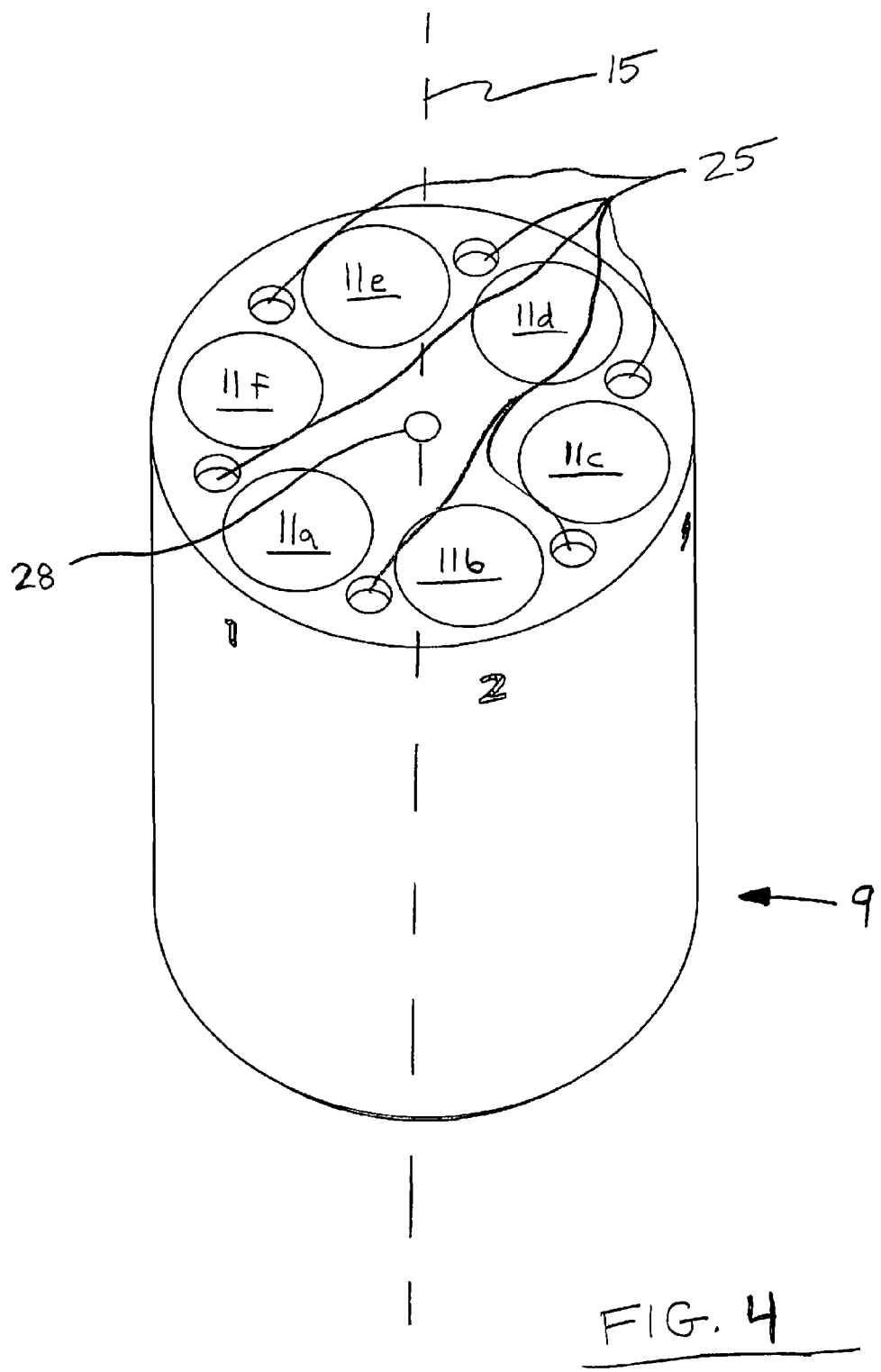
FIG. 4 illustrates another example of a receptacle body useful with the subject invention.
Figure 5:
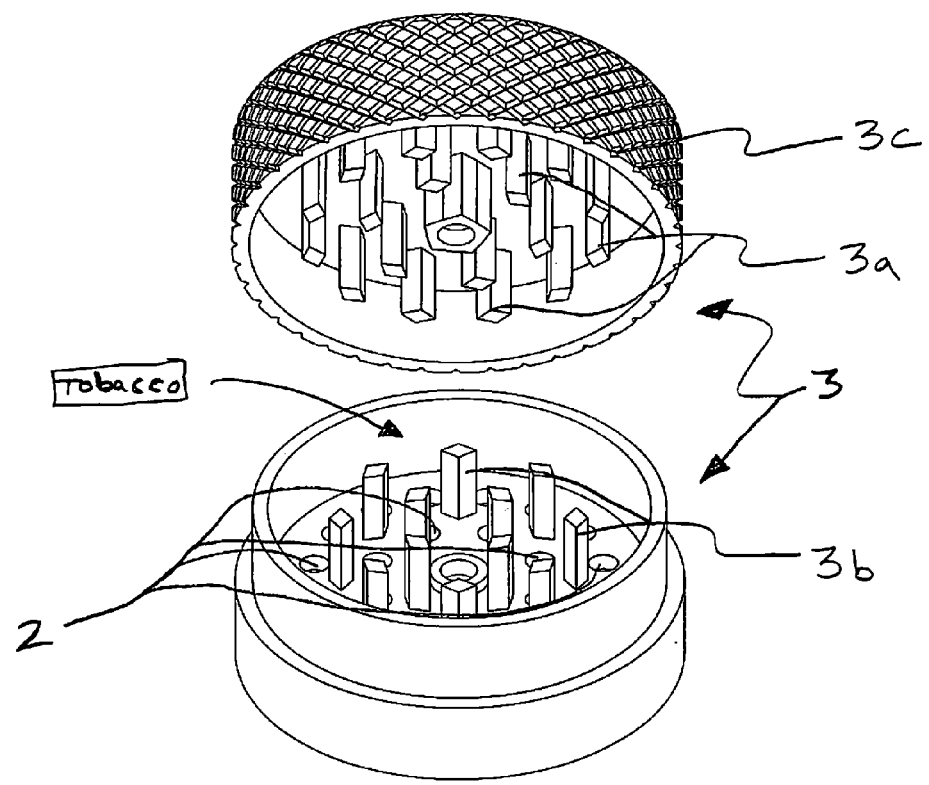
FIG. 5 illustrates one example of a grinder mechanism useful with the subject invention.
Figure 6:
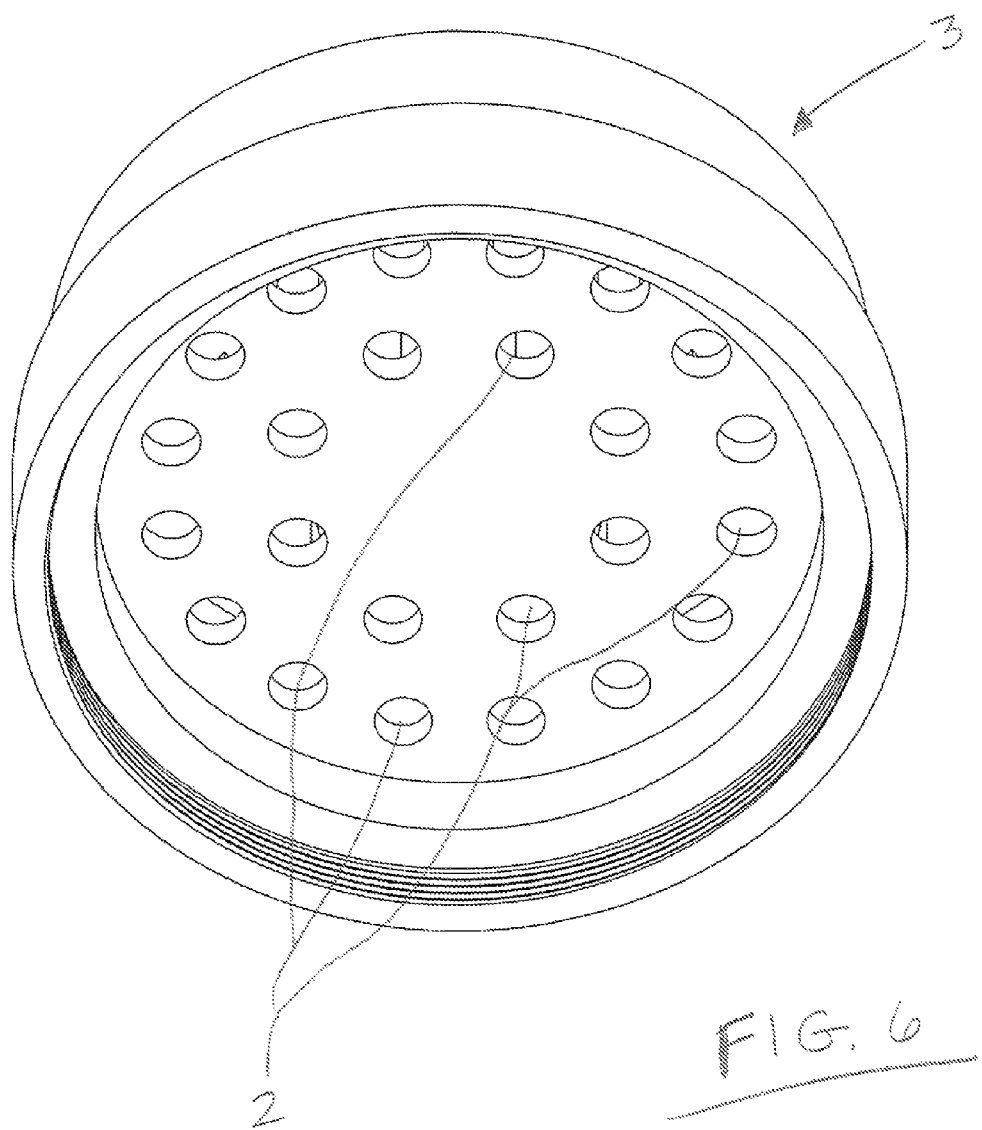
FIG. 6 illustrates a bottom, perspective view of a lower portion of the grinder mechanism illustrated in FIG. 5.

Grinding mechanism 3, as illustrated in FIG. 5, is preferably but not necessarily at least a two-part mechanism which may be opened, as depicted in the drawings, to insert or load grindable material such as tobacco. Once tobacco, or a similar substance, is loaded into the grinding mechanism, the upper and lower halves of mechanism 3 are assembled to one another, such that they are rotatable one with respect to the other. When rotated as such, upper and lower "teeth" 3a and 3b act in concert with each other (e.g., move past each other, with the inserted tobacco forced or pushed between the upper and lower teeth) to break-up, macerate, and/or grind the inserted tobacco into smaller, preferably fine bits or portions which are more easily burned for smoking. Of course, while the illustrated grinding mechanism 3 works well with apparatus 1, and includes knurled grip portions 3c for providing a reliable gripping surface when hand grinding tobacco, other grinder mechanism types may be used with the present invention. For example, a hand crank and/or one or more motors may be provided to assist with grinding operations. Moreover, banks of teeth 3a and 3b may be replaced with other grinder elements such as cutting blades or crushing elements.

Figure 7A:
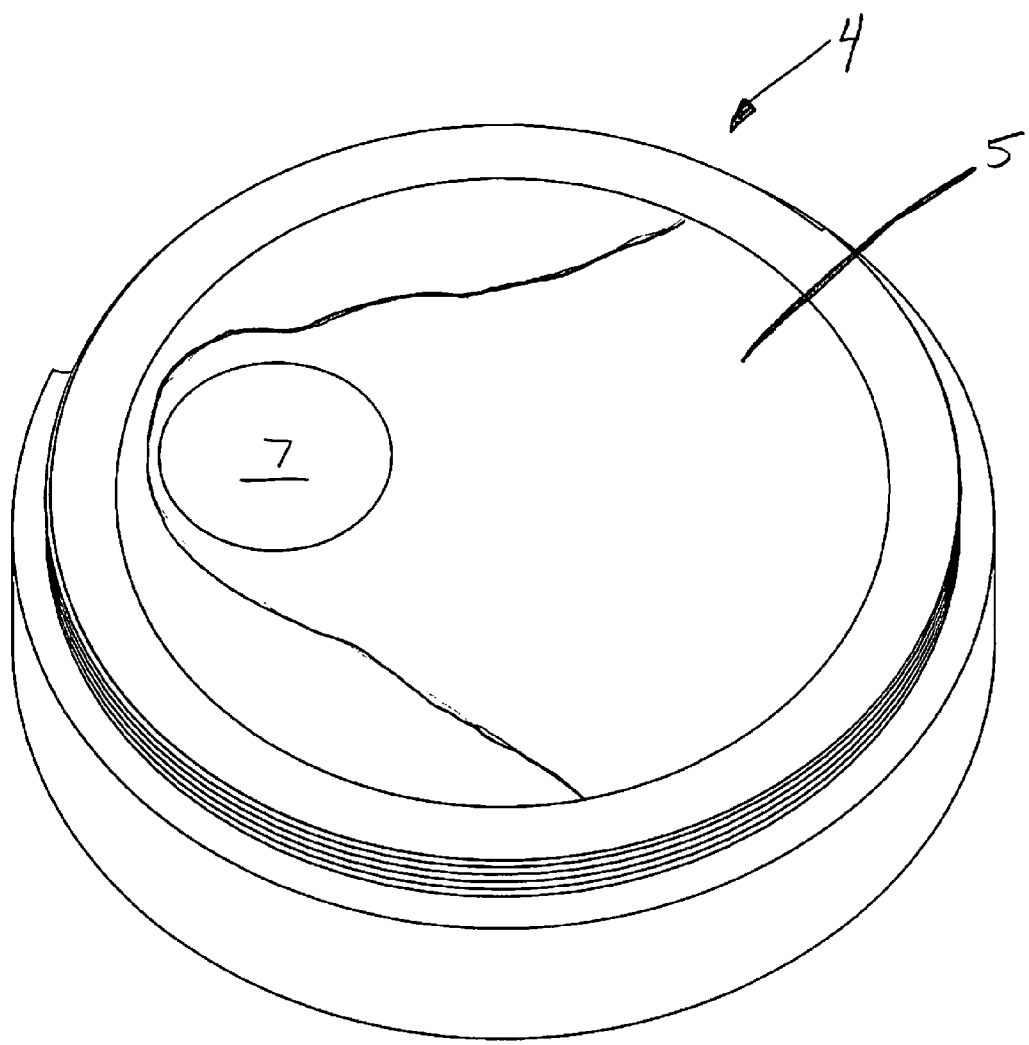
FIG. 7A illustrates one example of an intermediate body useful with the subject invention.
Figure 7B:
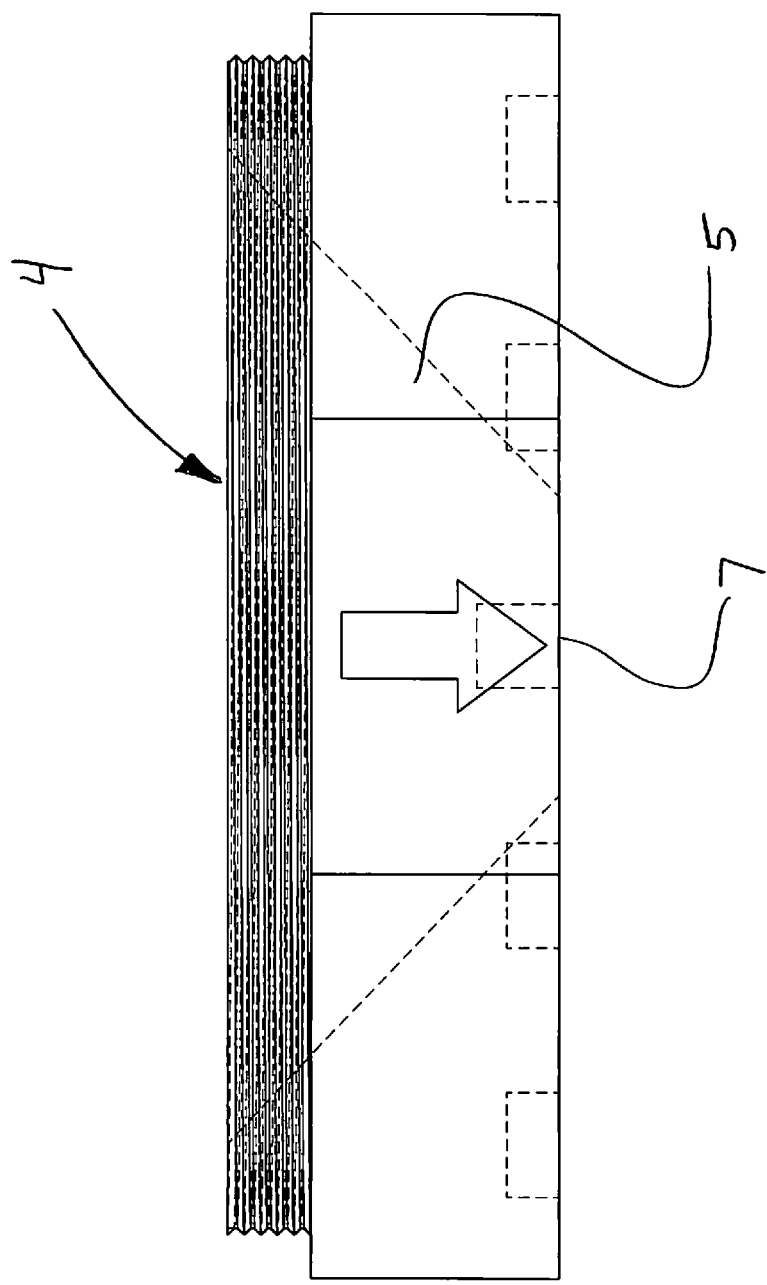
FIG. 7B illustrates a side, partial x-ray view of the intermediate body illustrated in FIG. 7A.
Figure 7C:
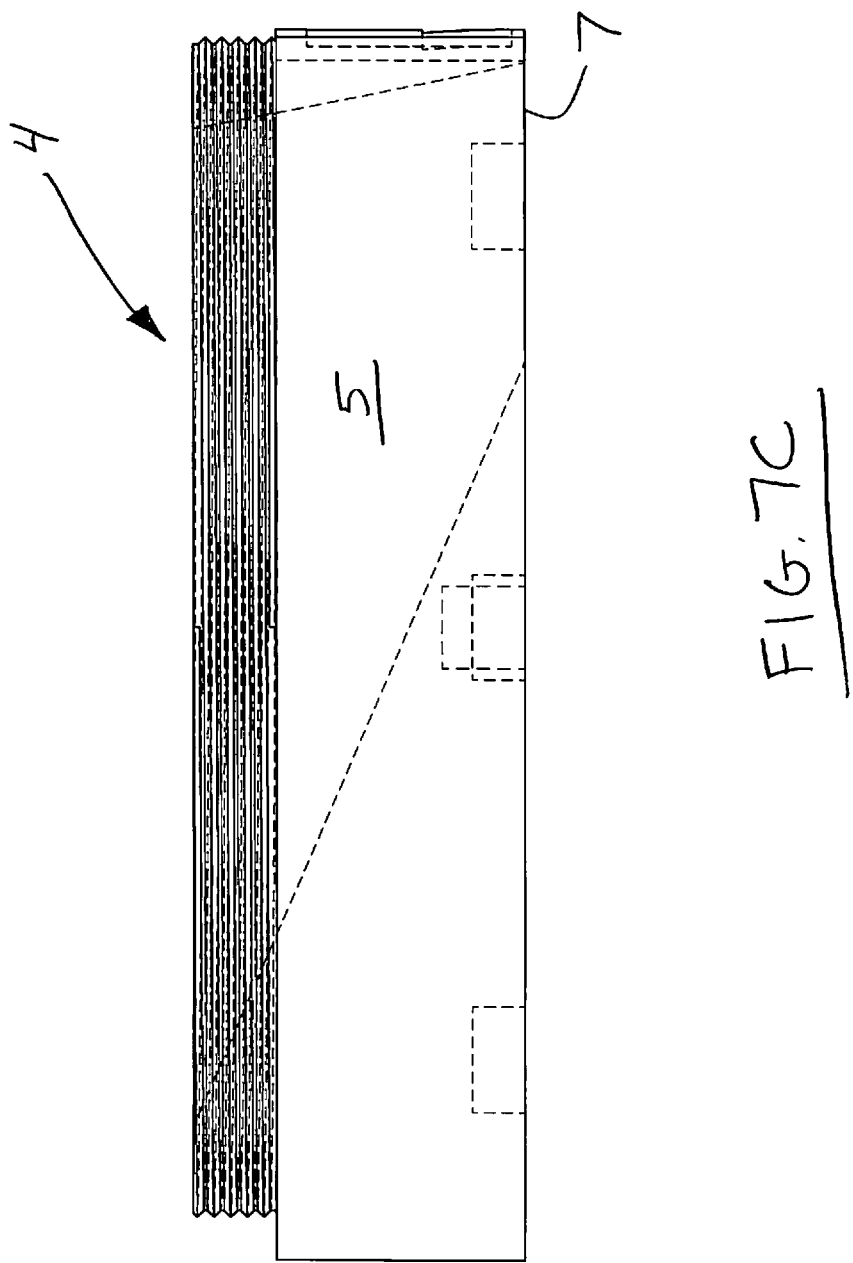
FIG. 7C illustrates an alternative side, partial x-ray view of the intermediate body illustrated in FIG. 7A.
Figure 7D:
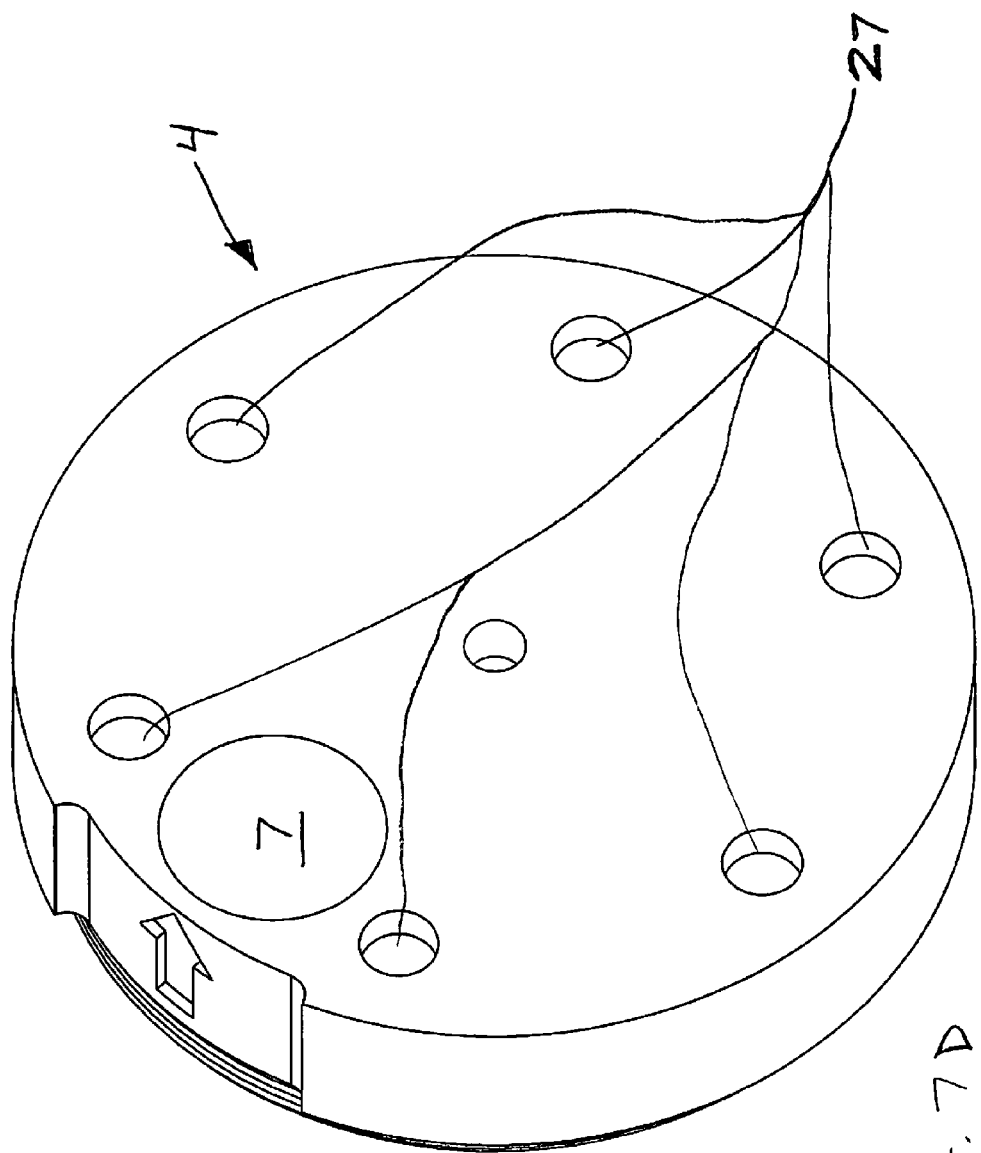
FIG. 7D illustrates a bottom, perspective view of a lower portion of the intermediate body illustrated in FIG. 7A.
Figure 8:
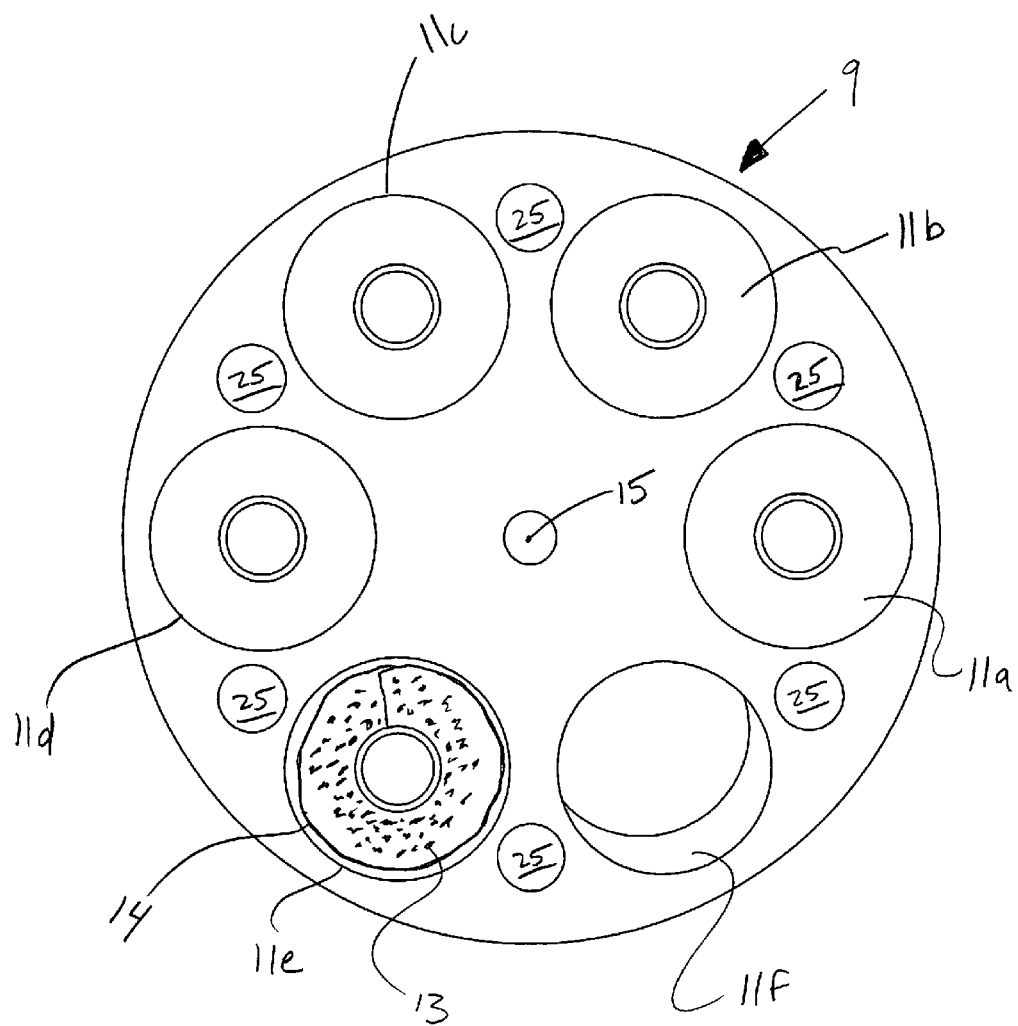
FIG. 8 illustrates one example of a receptacle body useful with the subject invention, with an example wrapping paper, and ground material, loaded into a receptacle volume.
Figure 9:
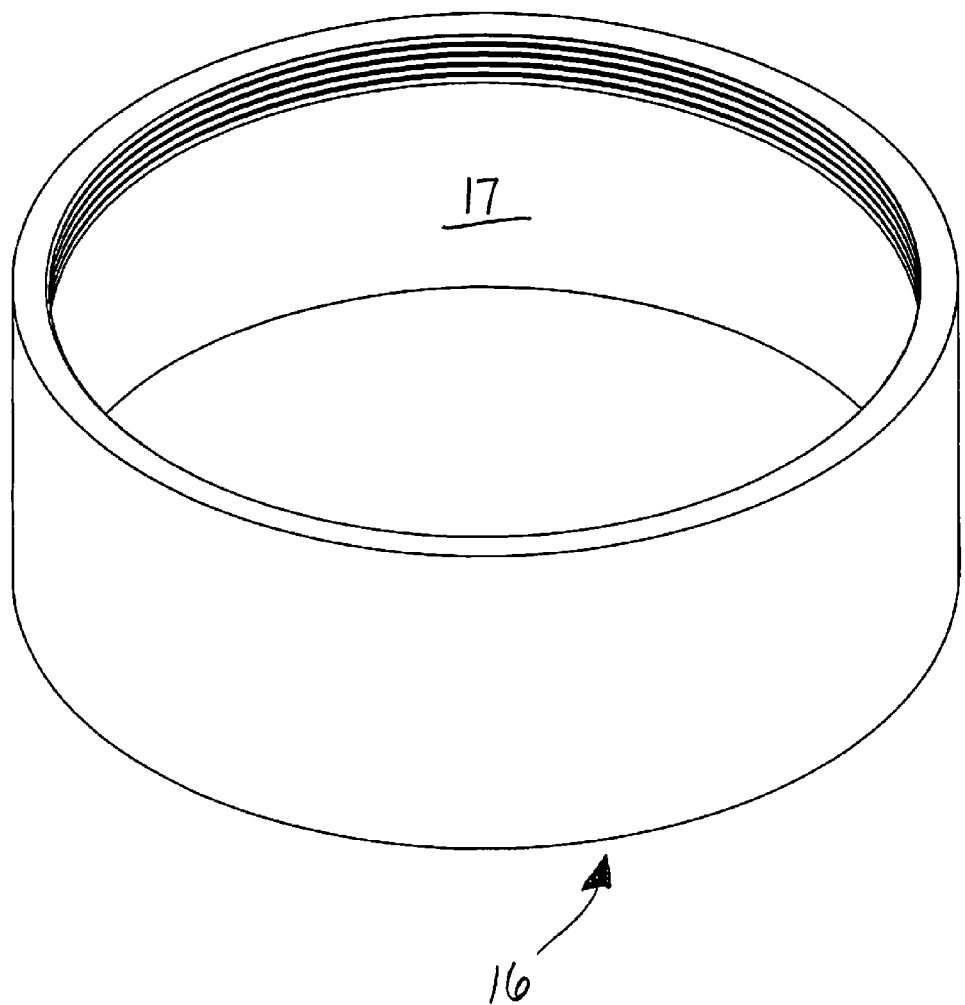
FIG. 9 illustrates one example of a storage chamber useful with the subject invention.
Figure 10:
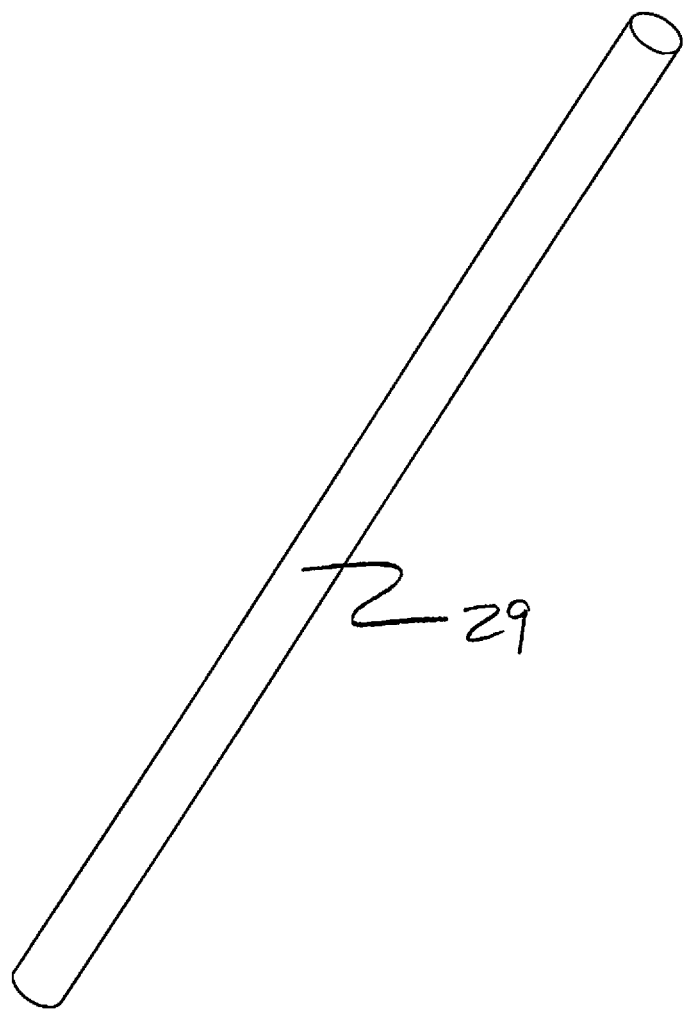
FIG. 10 illustrates one example of an optional tamping rod useful with the subject invention.

Once the inserted tobacco (or any other substance added to the device to be ground) is processed in grinder mechanism 3, the smaller, fine tobacco particles which are obtained during a grinding operation are small enough to pass through grinder apertures 2, through which they exit grinder mechanism 3 and enter intermediate chamber 5. Intermediate chamber 5, as seen for example in FIGS. 7A-7C, is formed in intermediate body 4 and includes an intermediate chamber aperture 7. Chamber 5 is primarily utilized to "catch" ground material, after it is ground in grinder mechanism 3, and then to deliver the ground material to one or more receptacle volumes, or to a storage delivery volume. In this regard, intermediate body 4 is rotatable about central axis 15 (see, e.g., FIGS. 1-2) so as to be able to align chamber aperture 7 with a selected receptacle volume or a storage delivery volume (as described more fully below). Chamber 5 preferably (but not necessarily) includes a sloped or angled "floor" or bottom surface which is included and angled and/or otherwise configured to direct the flow of "caught" ground material to and towards intermediate chamber aperture 7.

In preferred embodiments, chamber aperture 7 has a diameter or opening size which is a fraction of the surface area of the floor or bottom surface of intermediate chamber 5. In particularly preferred (but still optional) embodiments, the aperture opening size is a size selected from between approximately 1/20th to 1/4 of the surface area of the chamber's floor or bottom surface. In particular, such a sized opening is selected so that a metered or otherwise limited or controlled amount or rate of ground material may be delivered by the chamber aperture 7 to a specifically selected volume of receptacle body 9. In the most preferred embodiments, aperture 7 opening is so sized and positioned such that it is similar to or closely matched to the size of upper receptacle volume apertures or openings within receptacle body 9. In such or other preferred (but still optional) embodiments, intermediate body 4 is rotatable relative to receptacle body 9 in order to match or align the location of chamber aperture 7 with a desired receptacle volume (e.g., one of volumes 11a-11f) of receptacle body 9. More specifically, by selectively aligning chamber aperture 7 with a chosen receptacle volume 11a-11f, ground material, such as ground tobacco, may be delivered directly from intermediate chamber 5 to the selected aperture volume (e.g., selected from volume 11a-11f).

In certain embodiments, in order to aid with alignment of chamber aperture 7 with a selected aperture volume 11a-11f and/or as an aid to maintaining such alignment, magnetic and/or paramagnetic elements may be included at select locations on apparatus 1. More specifically, in the non-limiting example embodiments illustrated in FIGS. 7D and 8, magnets 25 and paramagnetic elements 27 are included positioned or located near or adjacent to receptacle volume apertures 11a-11f (see FIG. 8) and near or adjacent to chamber aperture 7 (see FIG. 7D). By including magnets and paramagnetic elements located as illustrated, when two magnets, as a defined pair, are aligned with two paramagnetic elements, as a defined pair, alignment of chamber aperture 7 with one of the six illustrated receptacle volumes 11a-11f is ensured. Moreover, because of the magnetic attraction of the magnets to the paramagnetic elements, the alignment of chamber aperture 7 to the selected receptacle volume is maintained until a sufficient, intentional "breaking force" is applied to break the magnetic attraction of the magnets/paramagnetic element pairs. Maintaining such alignment, of course, ensures that when ground material, such as ground tobacco, exits chamber aperture 7, the ground material is successfully delivered to a chosen or selected receptacle volume (e.g., one of volumes 11a-11f).

During operation of grinder apparatus 1, once tobacco or another material is loaded into the grinding chamber (i.e., the inner volume of grinder mechanism 3), a device user can select where, within the device, he/she wishes the resulting ground material to be delivered. For example, in the non-limiting embodiment of the invention which is illustrated, there are six different receptacle volumes housed within receptacle body 9. Five of these volumes, in the illustrated embodiment, are conical in configuration (see volumes 11a-11e) and are preferably (but not necessarily) provided with visual markings (e.g., Arabic or Roman numerals), so that the volume identity may be readily visually ascertained. Of course, other markings may be used to identify a volume, such as Braille-type markings, or no markings included at all. The sixth depicted volume, illustrated in the example embodiment as volume 11f (marked with the letter "E" in the drawings), is, however, not conical in configuration but instead comprises a simple cylinder with an open, rather than closed bottom. Employing the illustrated volume configurations, a user can load smoking paper, rolled into a conical configuration, into one or more of volumes 11a-11e prior to a grinding operation. Once loaded as such, a user of the device can choose to deliver ground material (such as ground tobacco) directly into a desired volume containing pre-loaded smoking paper. In this manner, a more efficient method of assembling custom smoking "cigarettes" is accomplished. Conversely, if the device user does not wish to assemble a "cigarette", or if there is excess ground material, the device user can select volume 11f as a delivery location, so that the ground tobacco or other material passes into the cylinder of volume 11f and then from the cylinder into storage chamber 17 of storage body 16. Selection of a delivery location for ground material is accomplished, of course, by simply rotating receptacle body 9 relative to intermediate body 4 to align chamber aperture 7 with the desired receptacle volume 11a-11f.

When utilizing grinding apparatus 1 to assemble custom cigarette-type smoking products, it may be desirable to tamp down or pack ground material into pre-loaded wrapping papers. Therefore, in certain optional embodiments, a tamping rod 29 is preferably included with the apparatus which may optionally be stored in aperture 28 located near or at the central axis of receptacle body 9. Other storage locations may of course be provided.

Note, while six receptacle volumes are illustrated and described in the present application, other numbers and configurations of receptacle volumes may be employed without departing from the scope of the subject invention. Moreover, the use of magnets/paramagnetic elements to align chamber aperture 7 with a receptacle volume is optional, and alternative alignment mechanisms may, of course, be employed, or alignment aids may be eliminated all together.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined.

I claim:

1. Apparatus comprising:
a grinding chamber, including a grinder mechanism, for grinding a grindable material;
an intermediate body rotatable about a central axis;
an intermediate chamber, located within said intermediate body, for receiving ground material which has been ground by said grinder mechanism, wherein the intermediate chamber includes a downwardly sloping bottom surface, for collecting and thereafter delivering received ground material, and a delivery aperture located proximal a bottom area of said downwardly sloping bottom surface, said delivery aperture being located offset from said central axis and located to deliver ground material to a selected delivery location;
a receptacle body rotatable about said central axis;
a plurality of receptacles contained within said receptacle body for receiving ground material, ground by said grinder mechanism, each one of said plurality of receptacles defining a separate receptacle volume, each one of said plurality of separate receptacle volumes being located off set from said central axis, each one of said plurality of separate receptacle volumes being separately, selectively alignable with said delivery aperture to thereby selectively receive ground material dispensed from said intermediate chamber at a location offset from said central axis;
wherein said intermediate body and said receptacle body are so designed and assembled so as to be rotatable, about said central axis, with respect to one another thereby to selectively align one of said plurality of receptacle volumes with said delivery aperture of said intermediate body, at a location offset from said central axis, to enable delivery of ground material from said intermediate chamber to said aligned receptacle volume via said delivery aperture;
a storage chamber formed in a storage body, said storage body being located at and connected to said receptacle body; and
a storage receptacle, contained within said receptacle body, said storage receptacle defining a separate storage receptacle volume having an opening at a bottom end thereof for ground material to pass through to be delivered to and stored within said storage chamber.

2. Apparatus according to claim 1 wherein said intermediate body has a top side and a bottom side;
said grinding chamber being so located at and connected to the top side of said intermediate body such that when said grinder mechanism is operated to grind grindable material, ground material delivers from said grinding chamber to said intermediate chamber; and
said receptacle body being so located at and connected to said bottom side of said intermediate chamber, such that when said intermediate chamber contains ground material and said aperture of said intermediate chamber is aligned with one of said plurality of receptacle volumes, ground material is delivered from said intermediate chamber to said aligned receptacle volume.

3. Apparatus according to claim 2 further including one or more magnetic elements and one or more paramagnetic elements, said magnetic and paramagnetic elements being so located and oriented such that attraction of said paramagnetic elements to said magnetic elements aids in aligning said aperture of said intermediate chamber to at least one of said receptacle volumes.

4. Apparatus according to claim 2 further including at least two spaced apart magnetic elements and at least two spaced apart paramagnetic elements, said magnetic and paramagnetic elements being located on opposite rotatable bodies selected from said intermediate body and said receptacle body, wherein when said at least two spaced apart magnetic elements are aligned with said at least two paramagnetic elements, as a result of rotation of said intermediate body relative to said receptacle body, said aperture of said intermediate body is aligned with at least one of said receptacle volumes.

5. Apparatus according to claim 4 wherein at least one of said receptacle volumes includes a bottom end which is at least substantially closed such that ground material may be retained, after grinding, in said receptacle volume.

6. Apparatus according to claim 5 wherein at least one of said receptacle volumes includes a wrapping paper in a cone or cylindrical form, nested within said at least one receptacle volume, for receipt of ground material ground by said grinder mechanism and delivered by said aperture of said intermediate chamber.

7. Apparatus according to claim 5 wherein at least one of said receptacle volumes is conical in configuration.

8. Apparatus according to claim 7 wherein said grinder mechanism is a manually operated grinder mechanism which grinds material located within said grinding chamber, when said grinder mechanism is operated by hand.

9. Apparatus according to claim 7 wherein said grinder mechanism is operated by a grinder motor, and wherein said grinder mechanism grinds material located within said grinding chamber, when said grinder motor is operated.

10. Apparatus according to claim 7 further including a removable tamping rod carried within a rod aperture.

11. Apparatus according to claim 7 wherein said grinding chamber is removably connected to said intermediate body;
said intermediate body is removably connected to said receptacle body; and
said receptacle body is removably connected to said storage body.

12. Apparatus according to claim 11 further including a vibration inducing mechanism which, when operated, induces vibration in at least said receptacle body and/or said intermediate body, and thereby aids in facilitating transmission of ground material from said intermediate chamber to at least one receptacle volume.

* * * * *